United States Patent
Hutzli et al.

(10) Patent No.: US 6,628,668 B1
(45) Date of Patent: Sep. 30, 2003

(54) CROSSPOINT SWITCH BANDWIDTH ALLOCATION MANAGEMENT

(75) Inventors: Peter Hutzli, Acton, MA (US); David N. Peck, Northbridge, MA (US); Thomas A. Manning, Northboro, MA (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/270,950

(22) Filed: Mar. 16, 1999

(51) Int. Cl.[7] .................................................. H04J 3/16
(52) U.S. Cl. .............. 370/468; 370/395.21; 370/395.41
(58) Field of Search ................................. 370/229–235, 370/252, 253, 395.2, 395.21, 395.4, 395.41, 395.42, 395.43, 412, 413, 415, 417, 468, 395.61; 709/103, 104, 225, 226, 228

(56) References Cited

U.S. PATENT DOCUMENTS

| | | | | |
|---|---|---|---|---|
| 5,745,694 A | * | 4/1998 | Egawa et al. | 709/225 |
| 5,850,399 A | * | 12/1998 | Ganmukhi et al. | 370/395.43 |
| 5,978,374 A | * | 11/1999 | Ghaibeh et al. | 370/412 |
| 5,982,748 A | * | 11/1999 | Yin et al. | 370/232 |
| 6,046,981 A | * | 4/2000 | Ramamurthy et al. | 370/232 |
| 6,175,572 B1 | * | 1/2001 | Kim | 370/468 |
| 6,212,163 B1 | * | 4/2001 | Aida | 370/230 |
| 6,359,889 B1 | * | 3/2002 | Tazaki et al. | 370/395.61 |
| 6,438,134 B1 | * | 8/2002 | Chow et al. | 370/412 |

OTHER PUBLICATIONS

*Affidavit of Thomas A. Manning executed on Aug. 16, 1999 with Exhibits A–H.*
*Affidavit of Mark Bernasconi executed on Dec. 13, 1999 with Exhibits A–E.*
*Affidavit of Jerome executed on Dec. 16, 1999 with Exhibit A.*

* cited by examiner

Primary Examiner—Douglas Olms
Assistant Examiner—Phirin Sam
(74) Attorney, Agent, or Firm—Weingarten, Schurgin, Gagnebin & Lebovici LLP

(57) ABSTRACT

A system for allocating bandwidth in a network element. The system determines whether a bandwidth allocation request is associated with a delay sensitive connection type. If so, the system selects a bandwidth allocation algorithm from a first set of bandwidth allocation algorithms. Otherwise, the system selects a bandwidth allocation algorithm from a second set of bandwidth allocation algorithms. The size of the bandwidth allocation request may be examined when selecting which bandwidth allocation algorithm to use. The system may round up the size of the bandwidth allocation request to a predetermined value. The selected bandwidth allocation algorithm may reserve slots in a bandwidth allocation table. Reserved slots that are equally spaced in the bandwidth allocation table avoid undue delays in servicing an associated connection. A binary tree representation of the table is described, wherein leaves of the binary tree correspond to individual table slots. Specific bandwidth allocation algorithms are described which are advantageously applicable when allocating bandwidth to delay sensitive or relatively delay insensitive connection types.

25 Claims, 5 Drawing Sheets

CROSSPOINT SWITCH BANDWIDTH ALLOCATION MANAGEMENT

CROSS REFERENCE TO RELATED APPLICATIONS

Not Applicable

STATEMENT REGARDING FEDERALLY SPONSORED RESEARCH DEVELOPMENT

Not Applicable

BACKGROUND OF THE INVENTION

In many devices and/or systems used to facilitate data communications, resources must be shared between multiple users or requesters. For example, a switching device may be used to support multiple virtual connections which pass through it. As such connections are established, the switch receives requests to reserve sufficient bandwidth within the switch to support the Quality of Service (QOS) parameters associated with each connection. In order to support the largest possible number of connections, the switch must allocate bandwidth in a manner which minimizes any excess bandwidth allocation. In addition, bandwidth must be allocated across multiple connections in a way that avoids undue delay in processing data units for any particular one of the connections.

Additional performance considerations relate to processing of the bandwidth reservation requests. In general, the number of operations necessary to satisfy a given request should be minimized. This becomes especially important when the switch must support large numbers of connections.

In existing systems, significant amounts of excess bandwidth allocation have resulted in unnecessary denials of bandwidth allocation requests. Such systems also failed to allocate bandwidth in a manner which closely matched the delay sensitivity of the specific connections.

Thus, in view of the prior art's shortcomings, there is a need for a bandwidth allocation system in a network switch that accurately matches the amount of bandwidth allocated for a connection to the amount of bandwidth requested. The system should allocate bandwidth such that no undue delays are introduced to traffic on connections through the switch. The system should also service bandwidth allocation requests with a minimum of delay.

SUMMARY OF THE INVENTION

In accordance with principles of the invention, a new system for allocating bandwidth in a communications device is disclosed. The disclosed system receives a bandwidth allocation request, as is received during establishment of a virtual connection, and determines whether the request is associated with a delay sensitive connection type. Examples of delay sensitive connection types include Continuous Bit Rate (CBR) connections, and Real Time Variable Bit Rate (RT-VBR) connections. In the event that the bandwidth allocation request is associated with a delay sensitive connection type, the system selects a bandwidth allocation algorithm from a first set of bandwidth allocation algorithms. If the bandwidth allocation request is not associated with a delay sensitive connection type, then the system selects a bandwidth allocation algorithm from a second set of bandwidth allocation algorithms.

In another aspect of the disclosed system, the size of the bandwidth allocation request is also examined when selecting which bandwidth allocation algorithm to use. The system selects a specific bandwidth allocation algorithm within the first set of algorithms for a delay sensitive connection if the size of the bandwidth allocation request falls within one or more predetermined ranges of values. The system may also round up the size of the bandwidth allocation request to a predetermined value, such as the upper limit of one of the predetermined value ranges, depending on which bandwidth allocation algorithm is selected.

In an illustrative embodiment, the selected bandwidth allocation algorithm reserves slots for the connection associated with the request in a bandwidth allocation table. The bandwidth allocation table is a data structure including a number of slots which represent times at which virtual connections may transmit data units across a switch fabric. For example, one of the bandwidth allocation algorithms in the first set of algorithms reserves slots that are equally spaced in the bandwidth allocation table. Because, in the illustrative embodiment, switch bandwidth is made available to various connections based on the order of the slots in the bandwidth allocation table, equally spaced reserved slots avoid uneven delays between opportunities to forward cells through the switch. To accomplish this even spacing of bandwidth allocation table slots, one of the first set of bandwidth allocation algorithms includes a bandwidth allocation algorithm which reserves a number of slots in the bandwidth allocation table equal to a power of two greater than or equal to the size of the bandwidth allocation request. For example, the next power of two greater than or equal to the size of the bandwidth allocation request may be selected. Then, given a bandwidth allocation table having a total number of slots also equal to a power of two, the reserved slots may be selected to be equidistant from each other.

In order to facilitate management of the bandwidth allocation table, the illustrative embodiment further includes a binary tree representation of the table. Leaves of the binary tree correspond to individual slots in the bandwidth allocation table. Allocation of a number of slots equal to a power of two may be accomplished by identifying a branch of the binary tree having leaves that each correspond to available slots, where the number of leaves in the branch is equal to the selected power of two.

In another aspect of the disclosed system, a bandwidth allocation algorithm is described which reserves sets of slots in the bandwidth allocation table, such that the resulting number of reserved slots is equal to a sum of powers of two. Again, the number of slots reserved is equal to or greater than the size of the bandwidth allocation request. This bandwidth allocation algorithm is generally applicable to bandwidth allocation requests which are not associated with delay sensitive connections.

In another aspect of the disclosed system, a bandwidth allocation algorithm is described which reserves sets of slots in the switch allocation table, such that the resulting number of reserved slots is equal to a power of two multiplied by an integer. As above, the number of reserved slots is equal to or greater than the size of the bandwidth allocation request. This bandwidth allocation algorithm is advantageously applicable to bandwidth allocation requests which are associated with delay sensitive connections.

Also disclosed is a bandwidth allocation algorithm which reserves sets of slots in the switch allocation table, such that the resulting number of reserved slots is equal to a power of two multiplied by a predetermined value and incremented by a remainder value, where the remainder value is equal to or greater than a size of the bandwidth allocation request minus the product of the power of two and the predetermined value. This bandwidth allocation algorithm is applicable to bandwidth allocation requests which are not associated with delay sensitive connections.

Thus there is disclosed a bandwidth allocation system for a network element or device, such as a network switch, that addresses the aforementioned shortcomings of existing systems. The disclosed system accurately matches the amount of bandwidth allocated for a connection to the amount of bandwidth requested. The disclosed system also allocates bandwidth such that undue delays for traffic on connections through the switch are avoided. In addition, the disclosed system is able to service bandwidth allocation requests with a minimum of delay.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION OF THE INVENTION

Figure 1:
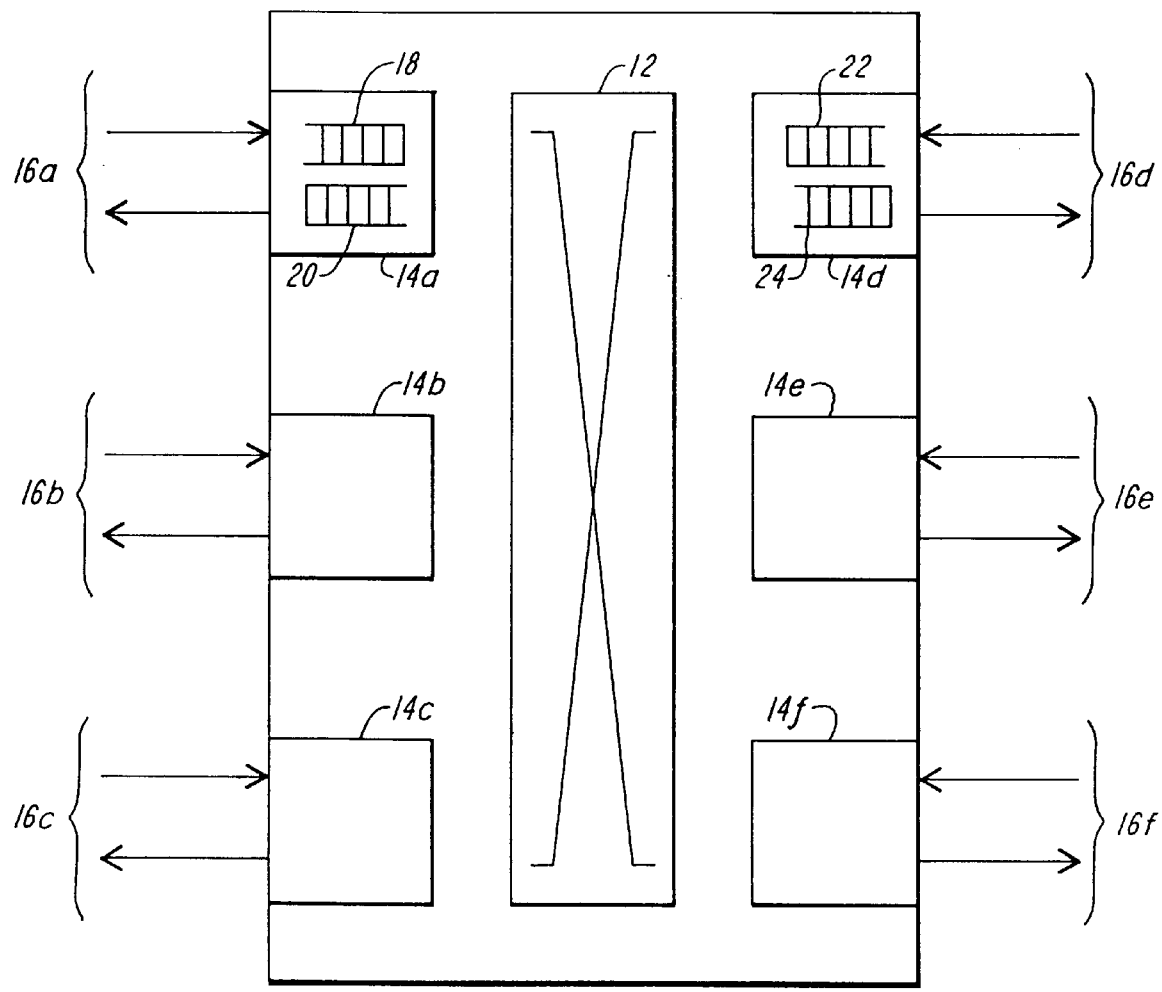
FIG. 1 shows a network switch.

FIG. 1 shows a network switch 10 including a switch fabric 12, and a number of ports 14. The ports 14 are each coupled to corresponding communication links 16. Port 14a is shown including receive buffers 18 and transmit buffers 20. Port 14d is shown including receive buffers 22 and transmit buffers 24.

During operation of the elements shown in FIG. 1, data units are received by the ports 14 of the switch 10 over the communication links 16. In an illustrative embodiment, the switch 10 supports the Asynchronous Transfer Mode (ATM) communications protocol, and accordingly the data units may be ATM cells. The received data units are stored in receive buffers, such as receive buffers 18. The data units are then forwarded through the switch fabric into transmit buffers such as transmit buffers 24, from which they are transmitted out of the switch 10. Each time slot during which a port may forward a data unit through the switch fabric is referred to as a data unit forwarding opportunity. Data unit forwarding opportunities may be reserved for use in connection with a particular virtual connection. The reservation of data unit forwarding opportunities to a virtual connection is referred to as allocating bandwidth to a virtual connection.

Figure 2:
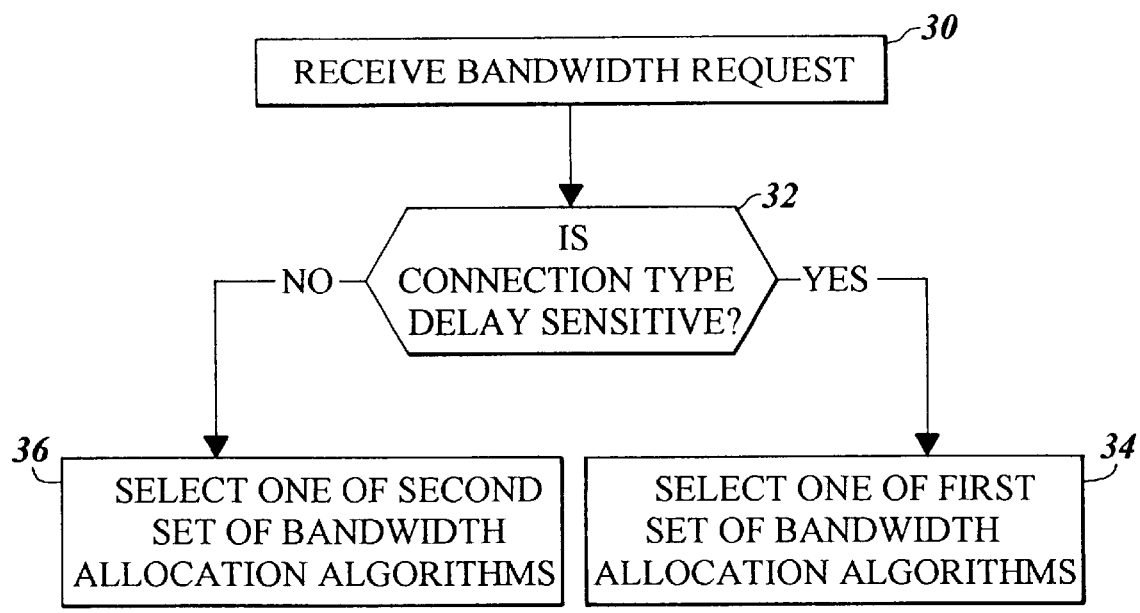
FIG. 2 is a flow chart showing steps performed in a network switch to allocate bandwidth to a virtual connection.

FIG. 2 shows steps performed by a network switch to allocate bandwidth to a virtual connection in accordance with the present invention. At step 30, the switch receives a message requesting that bandwidth within the switch be allocated to a particular virtual connection. The amount of bandwidth requested to be allocated is referred to as the "size" of the request, or the "request size". The units of the request size each correspond for example to an amount of bandwidth necessary to forward a data unit or cell through the switch fabric. In the example embodiment where the switch is an ATM switch, the message may be a call set-up message or an add-party message. The received message includes identification of the virtual connection for which the resources are to be allocated, as well as various Quality of Service parameters associated with the connection. The Quality of Service parameters may include indication of the maximum amount of delay and delay variation that can be tolerated by data units on the connection. The received message also indicates a type of the requested connection. Example connection types used in connection with the ATM protocol include Continuous Bit Rate (CBR), Real Time Variable Bit Rate (RTVBR), Non-Real Time Variable Bit Rate (NRTVBR), and Available Bit Rate (ABR). In an illustrative embodiment, CBR and RTVBR connections are considered delay sensitive, and NRTVBR and ABR are considered delay insensitive.

At step 32, the switch determines whether the connection type associated with the bandwidth request received at step 30 is considered to be delay sensitive. If so, step 32 is followed by step 34, in which one of a first set of bandwidth allocation algorithms is selected and executed to allocate switch bandwidth to the connection associated with the bandwidth request. Otherwise, step 32 is followed by step 36, in which one of a second set of bandwidth allocation algorithms is selected and executed to allocate switch bandwidth to the connection associated with the bandwidth request.

Figure 3:
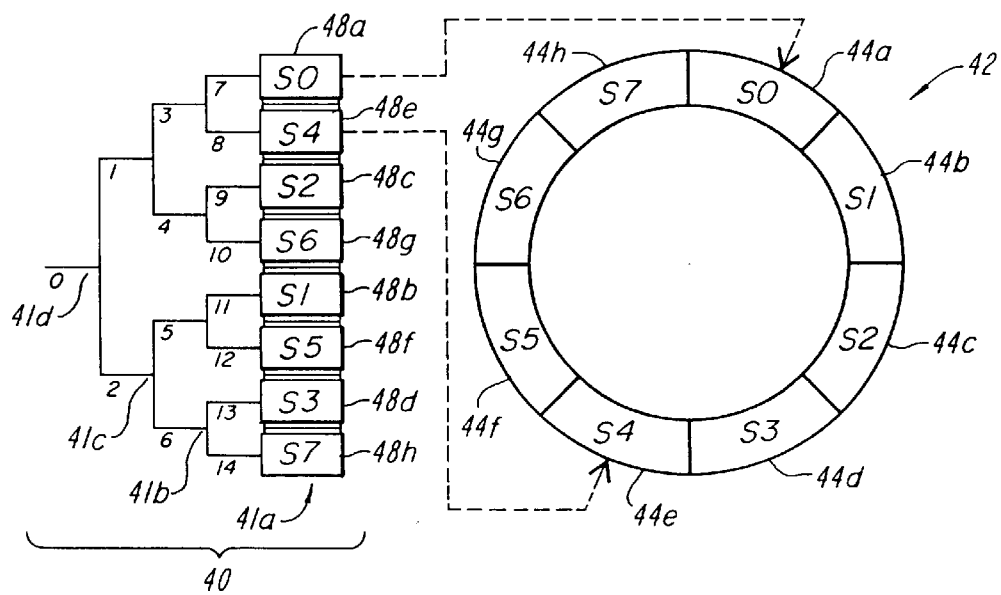
FIG. 3 shows a binary tree having leaves corresponding to slots in a bandwidth allocation table.

FIG. 3 shows a bandwidth allocation table 42, having slots 44a–44h. Each slot in the bandwidth allocation table corresponds to an opportunity to transmit a received data unit from a port associated with the bandwidth allocation table, through the switch fabric. The slots in the bandwidth allocation table may be allocated to particular virtual connections. For example, at time 0, a data unit associated with a first virtual connection may be forwarded through the switch fabric to another port. At time 1, a data unit associated with a second virtual connection may be forwarded, and so on. Multiple bandwidth allocation table slots may be allocated to a single virtual connection, depending on the QOS parameters and connection type of the connection.

Further in FIG. 3, a binary tree 40 is shown having leaves corresponding to individual slots of the bandwidth allocation table 42. Specifically, leaf 48a corresponds to slot 44a, leaf 48b corresponds to slot 44b, leaf 48c corresponds to slot 44c, and so on. The binary tree 40 includes 4 levels, 41a–41d. The leaves of the tree 40 are at level 41a, the nodes of the tree 40 at 41b correspond to a branch of the tree 40 including 2 leaves, the nodes of the tree 40 at level 41c correspond to a branch of the tree 40 including 4 leaves, and the root node at level 41b corresponds to the entire tree 40.

During operation of the system shown in FIG. 3, as slots in the bandwidth allocation table 42 are allocated to particular connections, the corresponding leaves in the binary tree 40 are also marked as allocated. In addition, the allocation state of the leaves in a branch may be stored in a parent node of that branch. For example, when both leaves 48a and 48e are unallocated, the parent node of those leaves at level 41b of the tree may be modified to indicate that all nodes in that branch of the tree 40 are available for allocation. Similarly, if nodes 48a, 48e, 48c and 48g are available for allocation, then the respective parent node at level 41c may indicate that all leaves in that branch of the tree 40 are available for allocation.

Figure 4:
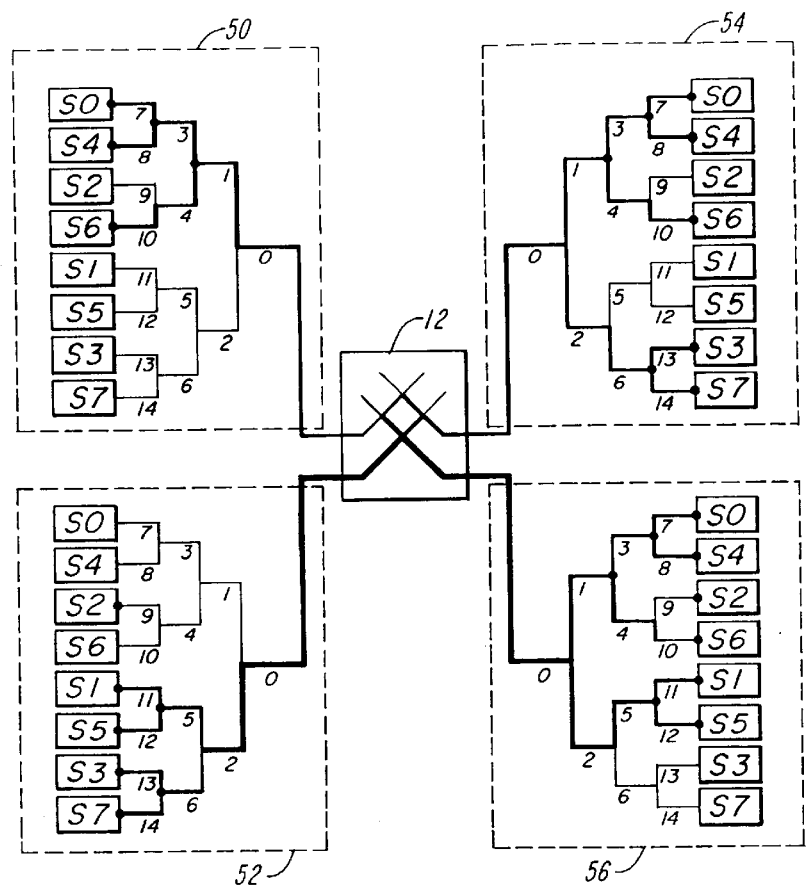
FIG. 4 shows binary trees corresponding to receive and transmit opportunities.

FIG. 4 shows binary trees associated with transmit and receive bandwidth for a number of ports in a switch. Binary trees 50 and 52 represent slots in bandwidth allocation tables for data unit forwarding bandwidth of a first port and a second port respectively. Binary trees 54 and 56 represent slots in bandwidth allocation tables for data unit receiving bandwidth of the first port and the second port respectively. During operation of the elements in FIG. 4, if a bandwidth request is received for a connection in which data units are forwarded from the first port to the second port, then the logical OR of the binary tree 50 and the binary tree 56 is examined to determine what slots at both the first port and the second port can potentially be allocated to the new connection. An appropriate bandwidth allocation algorithm is then used to allocate appropriate slots.

Figure 5:
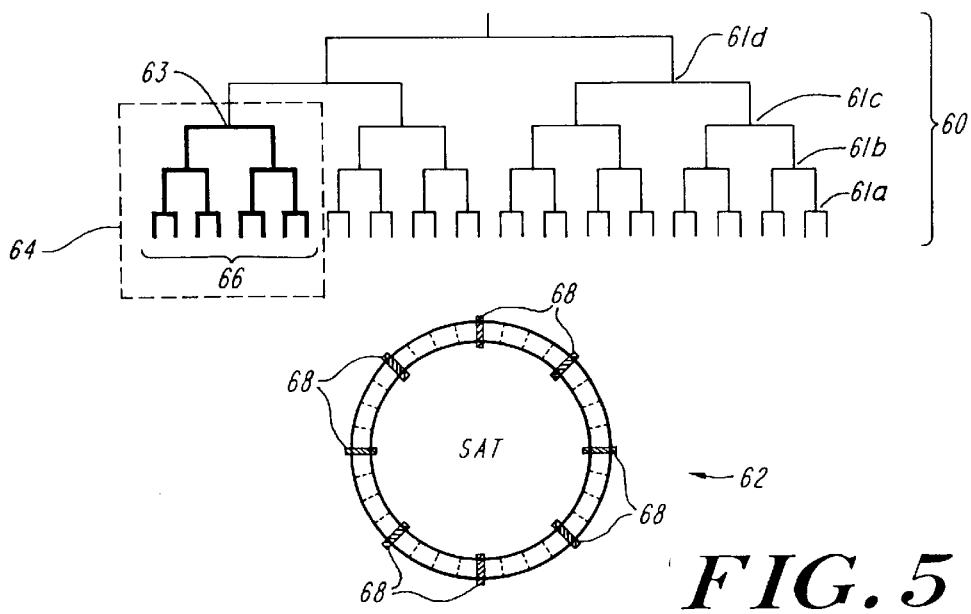
FIG. 5 illustrates a method for allocating bandwidth allocation table slots for a delay sensitive virtual connection.

FIG. 5 illustrates a bandwidth allocation algorithm appropriate for delay sensitive connection types. Accordingly, the bandwidth allocation algorithm illustrated in FIG. 5 would be one of the first set of bandwidth allocation algorithms as discussed with regard to step 34 of FIG. 2.

In the bandwidth allocation algorithm of FIG. 5, the binary tree 60 is searched for a single branch having a number of leaves sufficient to satisfy the size of a bandwidth allocation request, and where all the leaves of the branch are unallocated. For example, to satisfy a bandwidth request having a size of 8, the algorithm would determine that branch 64 includes 8 leaves which are all available for allocation. The algorithm then allocates the slots 68 of the bandwidth allocation table 62 corresponding to the leaves in branch 64 of the binary tree 60, and marks the leaves and other nodes in branch 64. Because the adjacent leaves of the binary tree 60 correspond to equally spaced slots in the bandwidth allocation table 62, the allocated slots 68 are equally spaced. Equal spacing of the allocated slots for a virtual connection potentially provides for minimal delay and delay variation in processing of data units associated with that connection.

In an illustrative embodiment, for a received bandwidth request having a size of 7, the algorithm of FIG. 5 would find a branch of the tree 60 with available leaves having a size equal to the next power of 2 greater than the bandwidth request size, in this case 8. In this way the algorithm may be said to "round-up" the size of the bandwidth request to a power of 2. Accordingly, the algorithm would determine that branch 64 was available and would allocate the leaves of branch 64 to satisfy the request. However, one slot of branch 64 would potentially be wasted, since only 7 slots are needed by the connection. Thus, while the algorithm of FIG. 5 provides equally spaced slots in the bandwidth allocation table, and as a result avoids excessive data unit buffering at receiving ports, it may waste slots in the bandwidth allocation table.

Figure 6:
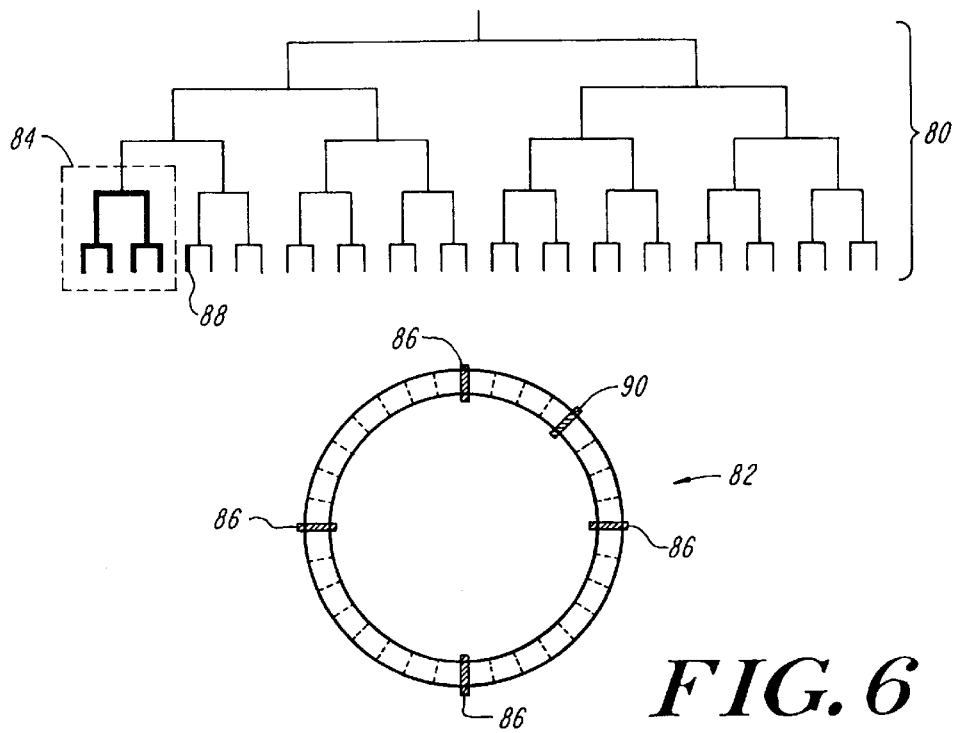
FIG. 6 shows a method of allocating slots in a bandwidth allocation table for a virtual connection that is not delay sensitive.

FIG. 6 illustrates a bandwidth allocation algorithm appropriate for delay insensitive, or relatively less delay connection types. Accordingly, the algorithm illustrated in FIG. 6 would be one of the second set of bandwidth allocation algorithms as discussed with regard to step 36 of FIG. 2.

In the bandwidth allocation algorithm of FIG. 6, the binary tree 80 is searched for a set of branches whose sum total of leaves matches or exceeds the size of the bandwidth request. In some cases, the number of powers of two in the sum of powers of two may be limited to preserve resources. Where the bandwidth request is for 5 data units of bandwidth, the algorithm of FIG. 6 would search the binary tree 60 for some combination of available branches whose sum total number of leaves equals 5, such as branch 84 and leaf 88 (a single leaf may constitute a branch). The slots 86 in bandwidth allocation table 82 correspond to the leaves of branch 84, and the slot 90 corresponds to the leaf 88. Thus it is seen that while there are no slots wasted by the allocation illustrated in FIG. 6, the spacing of the slots is not completely equal. Accordingly, some buffering at the receiving port and bursts of data unit forwarding may occur, adversely impacting the delay and delay variation characteristics of the associated connection.

In an alternative embodiment, the bandwidth allocation algorithm of FIG. 6 may used for delay sensitive connection types. In that alternative embodiment, the bandwidth allocation algorithm of FIG. 6 would be one of the first set of bandwidth allocation algorithms as discussed with regard to step 34 of FIG. 2.

Figure 7:
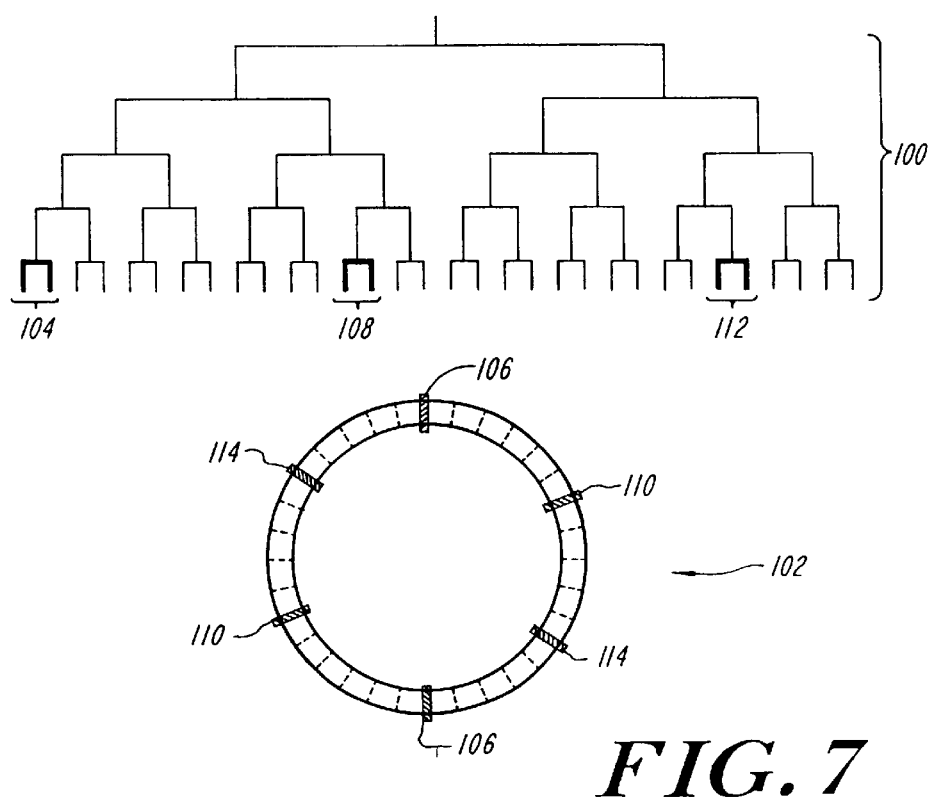
FIG. 7 shows another method of allocating slots in a bandwidth allocation table for a delay sensitive virtual connection.

FIG. 7 illustrates a bandwidth allocation algorithm appropriate for delay sensitive connection types. The bandwidth allocation algorithm of FIG. 7 is therefore one of the first set of bandwidth allocation algorithms as discussed with regard to step 34 of FIG. 2.

In the bandwidth allocation algorithm of FIG. 7, a number of equal sized branches of the tree 100 are selected to satisfy the connection request. In addition, the bandwidth allocation algorithm of FIG. 7 also insures that the selected branches of the tree 100 are equally spaced with regard to each other. For example, where the bandwidth request size is 6, the algorithm of FIG. 7 finds 3 branches, 104, 108 and 112 in the binary tree 100, each branch having two leaves. Slots 106 in the bandwidth allocation table correspond to the leaves of branch 104, the slots 110 correspond to the leaves of branch 108, and slots 114 correspond to the leaves of branch 112. Thus it is seen that the spacing of the allocated slots in the bandwidth allocation table is virtually equal. Accordingly, excessive receive port buffering is avoided.

While in the example allocation shown in FIG. 7, three equal sized branches of the tree 100 were used to satisfy the bandwidth request, other numbers of branches may be used. In an illustrative embodiment, the number of leaves in each of the equal sized branches is equal to $2^{y-2}$, where $2^y$ is the next power of 2 greater than the bandwidth request size.

Figure 8:
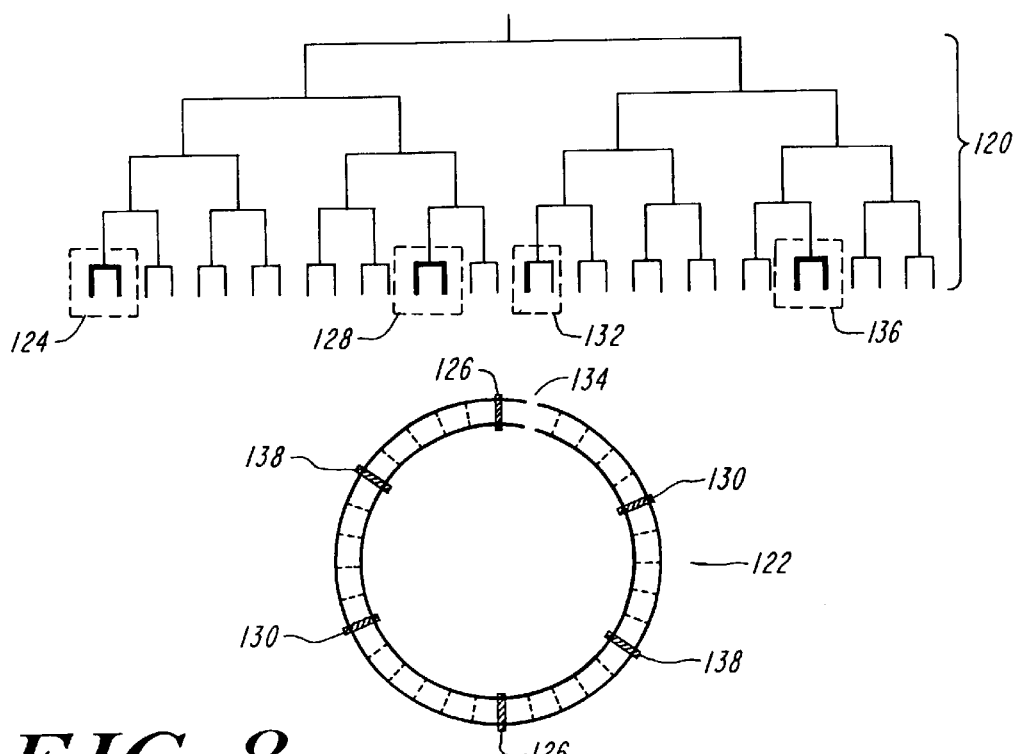
FIG. 8 shows another method of allocating slots in a bandwidth allocation table for a virtual connection that is not delay sensitive.

FIG. 8 illustrates a bandwidth allocation algorithm appropriate for delay insensitive or relatively less delay sensitive connection types. Therefore, the bandwidth allocation algorithm of FIG. 8 would be one of the second set of bandwidth allocation algorithms as discussed with regard to step 36 of FIG. 2.

The bandwidth allocation algorithm of FIG. 8 finds a number of equal sized branches in the binary tree 120 whose sum total of leaves is less than the size of the bandwidth request. The remaining leaves needed to satisfy the request are selected from between those equal sized branches, using branches of smaller sizes. For example, given a bandwidth request for seven bandwidth units, the bandwidth allocation algorithm of FIG. 8 would identify branches 124, 128 and 136 of the binary tree 120 as having available leaves. These branches would then be allocated, as well as leaf 132, for a total of 7 corresponding slots. Slots 126 correspond to branch 124, slots 130 correspond to branch 128, slots 138 correspond to branch 136, and slot 134 corresponds to leaf 132. In an illustrative embodiment, the number of equal sized branches used by the bandwidth allocation algorithm of FIG. 8 is 3. Alternatively, other numbers of equal sized branches may be used. In a further illustrative embodiment of the bandwidth allocation algorithm of FIG. 8, the equal sized branches are selected such that the slots corresponding their leaves are equal distances from each other within the bandwidth allocation table. In another illustrative embodiment of the bandwidth allocation algorithm of FIG. 8, the size of the equal sized branches is equal to $2^{y-2}$ leaves, where $2^y$ is the next power of 2 larger than the amount of bandwidth requested.

In an illustrative embodiment of the disclosed system, the bandwidth allocation algorithm of FIG. 5 is used to process those bandwidth requests having a size equal to a power of two which are for connections that are of a delay sensitive type. Further in the illustrative embodiment, bandwidth requests for delay sensitive connections having a size equal to a power of two multiplied by three (3, 6, 12, 24, 48 etc.) are processed using the bandwidth allocation algorithm described with relation to FIG. 7. Where the size of a bandwidth request for a delay sensitive connection is not equal to a power of two or the product of three and a power of two, the size of the request is rounded up to either the next greater power of two, or to the next largest product of a power of two and three, whichever is smaller.

Figure 9:
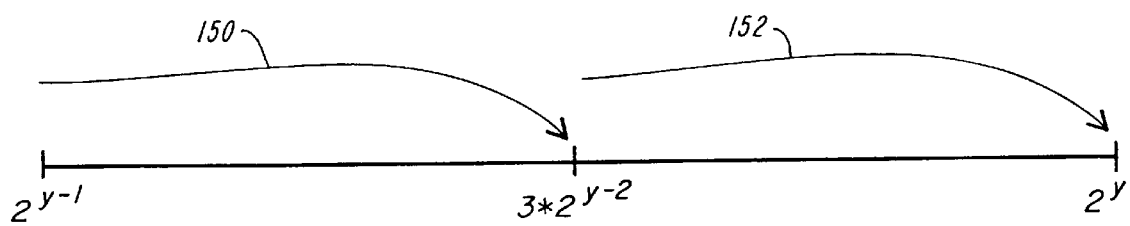
FIG. 9 illustrates selection between bandwidth allocation algorithms for delay sensitive connections.

FIG. 9 illustrates the selection of a bandwidth allocation algorithm for a bandwidth allocation request associated with a delay sensitive connection. In FIG. 9 the value $2^y$ is equal to the next power of 2 greater than or equal to the size of the bandwidth request. If the size of the bandwidth request is greater than $3*2^{y-2}$ and less than or equal to $2^y$, then the request size falls within the range 152. Accordingly, the request size is rounded up to $2^y$, and the bandwidth allocation algorithm of FIG. 5 is selected. If, in the alternative, the size of the bandwidth request is greater than $2^{y-1}$ and less than or equal to $3*2^{y-2}$, then the request size falls within the range 150. In that case, the request size is rounded up to $3*2^{y-2}$ and the bandwidth allocation algorithm of FIG. 7 is selected.

Figure 10:
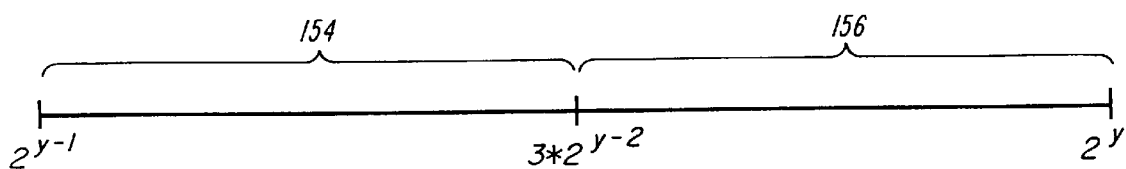
FIG. 10 illustrates selection between bandwidth allocation algorithms for delay insensitive connections.

FIG. 10 illustrates the selection of a bandwidth allocation algorithm for a bandwidth allocation request associated with a delay insensitive connection. In FIG. 10 the value $2^y$ is equal to the next power of 2 greater than or equal to the size of the bandwidth allocation request. If the size of the bandwidth request is equal to $2^y$ then the bandwidth allocation algorithm illustrated in FIG. 6 is selected. Note that in this case, where the bandwidth request has a size equal to a power of 2, the bandwidth allocation algorithm illustrated in FIG. 6 may operate substantially the same way as the bandwidth allocation algorithm of FIG. 5.

If the size of the bandwidth request is greater than $2^{y-1}$ and less than $3*2^{y-2}$, then the request size falls within the range 154. Accordingly, the request size is rounded up to the next sum of powers of 2 that is larger than or equal to the request size, and the bandwidth allocation algorithm illustrated in FIG. 6 is selected. For example, where the number of powers of two in the sum of powers of two is limited to preserve resources, then a sum of powers of two larger than the request size may be appropriate. If the request size is equal to $3*2^{y-2}$, then the bandwidth allocation algorithm of FIG. 8 is selected. In this case, where the request size is equal to the product of the predetermined value (3) and a power of 2, the bandwidth allocation algorithm of FIG. 8 may operate substantially the same way as the bandwidth allocation algorithm of FIG. 7.

If the request size is greater than $3*2^{y-2}$ and less than $2^y$, then the request size falls within the range 156. In this case the request size is rounded up to the next product of the predetermined value (3) and a power of two, plus a remainder value, that is greater than or equal to the request size. The bandwidth allocation algorithm illustrated in FIG. 8 is selected. The remainder value may be allocated using the bandwidth allocation algorithm illustrated in FIG. 6. In certain cases the size of any potential remainder value may be limited to preserve resources.

Those skilled in the art should readily appreciate that the programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media such as computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Specifically, while the preferred embodiments are disclosed with reference to a network switch implementation, the present invention is applicable to other types of network elements which must allocate resources to virtual connections. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A method for allocating bandwidth in a switch, comprising:

determining whether a bandwidth allocation request is associated with a delay sensitive connection type;

selecting, in the event that said bandwidth allocation request is associated with said delay sensitive connection type, at least one of a first set of bandwidth allocation algorithms;

selecting, in the event that said bandwidth allocation request is not associated with said delay sensitive connection type, at least one of a second set of bandwidth allocation algorithms; and responsive to a selected bandwidth allocation algorithm, reserving slots for a connection associated with said allocation request in a bandwidth allocation table, wherein said bandwidth allocation table includes a plurality of slots, each of said slots representing a time at which a predetermined number of data units may be transmitted across a switch fabric, wherein said predetermined number of data units is the same for each of said slots in said bandwidth allocation table, and wherein said at least one of said first set of bandwidth allocation algorithms allocates slots in said bandwidth allocation table that are spaced substantially equally from each other within said bandwidth allocation table.

2. The method of claim 1 wherein said delay sensitive connection type is a continuous bit rate connection type.

3. The method of claim 1 wherein said delay sensitive connection type is a real time variable bit rate connection type.

4. The method of claim 1, wherein said selecting at least one of said first set of bandwidth allocation algorithms further comprises selecting a first one of said first set of bandwidth allocation algorithms in the event that a size of said bandwidth allocation request falls within a first range.

5. The method of claim 4, wherein said selecting at least one of said first set of bandwidth allocation algorithms further comprises selecting a second one of said first set of bandwidth allocation algorithms in the event that said size of said bandwidth allocation request falls within a second range.

6. A method for allocating bandwidth in a switch, comprising:
   determining whether a bandwidth allocation request is associated with a delay sensitive connection type;
   selecting, in the event that said bandwidth allocation request is associated with said delay sensitive connection type, at least one of a first set of bandwidth allocation algorithms;
   selecting, in the event that said bandwidth allocation request is not associated with said delay sensitive connection type, at least one of a second set of bandwidth allocation algorithms;
   wherein said selecting at least one of said first set of bandwidth allocation algorithms further comprises selecting a first one of said first set of bandwidth allocation algorithms in the event that a size of said bandwidth allocation request falls within a first range; and
   further comprising rounding said size of said bandwidth allocation request up to a predetermined value responsive to said selecting said first one of said first set of bandwidth allocation algorithms.

7. The method of claim 6, wherein said predetermined value is an upper limit of said first range.

8. The method of claim 1, wherein said selecting at least one of a second set of bandwidth allocation algorithms further comprises selecting a first one of said second set of bandwidth allocation algorithms in the event that a size of said bandwidth allocation request falls within a first range.

9. The method of claim 8, wherein said selecting at least one of said second set of bandwidth allocation algorithms further comprises selecting a second one of said second set of bandwidth allocation algorithms in the event that said size of said bandwidth allocation request falls within a second range.

10. The method of claim 1, wherein said at least one of said first set of bandwidth allocation algorithms allocates slots in a bandwidth allocation table, wherein the allocated slots are spaced substantially equally from each other.

11. A method for allocating bandwidth in a switch, comprising:
   determining whether a bandwidth allocation request is associated with a delay sensitive connection type;
   selecting, in the event that said bandwidth allocation request is associated with said delay sensitive connection type, at least one of a first set of bandwidth allocation algorithms;
   selecting, in the event that said bandwidth allocation request is not associated with said delay sensitive connection type, at least one of a second set of bandwidth allocation algorithms; and
   wherein said at least one of said first set of bandwidth allocation algorithms reserves a number of said slots in said bandwidth allocation table equal to a power of two greater than a size of said bandwidth allocation request.

12. The method of claim 11, wherein said power of two greater than or equal to said size of said bandwidth allocation request is a next power of two greater than said size of said bandwidth allocation request.

13. The method of claim 11, wherein each of said plurality of slots in said bandwidth allocation table further represents an opportunity to forward said at least one data unit from an inbound port to an outbound port of said switch.

14. The method of claim 13, further comprising a binary tree representation of said plurality of slots in said bandwidth allocation table, wherein leaves of said binary tree correspond to individual slots of said bandwidth allocation table.

15. The method of claim 14, wherein said allocation of said number of slots equal to said power of two greater than said size of said bandwidth allocation request includes identifying a branch of said binary tree having a number of leaves corresponding to available slots, said number of leaves equal to said power of two.

16. A method for allocating bandwidth in a switch, comprising:
   determining whether a bandwidth allocation request is associated with a delay sensitive connection type;
   selecting, in the event that said bandwidth allocation request is associated with said delay sensitive connection type, at least one of a first set of bandwidth allocation algorithms;
   selecting, in the event that said bandwidth allocation request is not associated with said delay sensitive connection type, at least one of a second set of bandwidth allocation algorithms; and
   wherein said at least one of said first set of bandwidth allocation algorithms allocates a number of slots in a bandwidth allocation table equal to a power of two multiplied by an integer, wherein said number of slots is greater than or equal to a size of said bandwidth allocation request.

17. A method for allocating bandwidth in a switch, comprising:
   determining whether a bandwidth allocation request is associated with a delay sensitive connection type;
   selecting, in the event that said bandwidth allocation request is associated with said delay sensitive connection type, at least one of a first set of bandwidth allocation algorithms;
   selecting, in the event that said bandwidth allocation request is not associated with said delay sensitive connection type, at least one of a second set of bandwidth allocation algorithms, and
   wherein said at least one of said second set of bandwidth allocation algorithms allocates a number of said slots in said bandwidth allocation table equal to a sum of powers of two, wherein said number of slots is equal to or greater than a size of said bandwidth allocation request.

18. The method of claim 17, wherein each of said number of slots further represents an opportunity to forward a data unit from an inbound port to an outbound port of said switch.

19. The method of claim 18, further comprising a binary tree representation of said slots in said bandwidth allocation table, wherein leaves of said binary tree correspond to individual slots of said bandwidth allocation table.

20. The method of claim 19, wherein said allocation of said number of slots equal to said sum of powers of two includes identifying branches of said binary tree having numbers of leaves corresponding to available slots, said number of leaves equal to each power of two within said sum of powers of two.

21. A method for allocating bandwidth in a switch, comprising:
   determining whether a bandwidth allocation request is associated with a delay sensitive connection type;
   selecting, in the event that said bandwidth allocation request is associated with said delay sensitive connection type, at least one of a first set of bandwidth allocation algorithms;
   selecting, in the event that said bandwidth allocation request is not associated with said delay sensitive connection type, at least one of a second set of bandwidth allocation algorithms, and
   wherein said at least one of said second set of bandwidth allocation algorithms allocates a number of said slots in said bandwidth allocation table equal to a power of two multiplied by an integer and incremented by a remainder value, wherein said remainder value is equal to a size of said bandwidth allocation request minus said power of two multiplied by said integer.

22. A method for allocating bandwidth in a switch, comprising:
   determining whether a bandwidth allocation request is associated with a delay sensitive connection type;
   selecting, in the event that said bandwidth allocation request is associated with said delay sensitive connection type, at least one of a first set of bandwidth allocation algorithms;
   selecting, in the event that said bandwidth allocation request is not associated with said delay sensitive connection type, at least one of a second set of bandwidth allocation algorithms, and
   wherein said at least one of said first set of bandwidth allocation algorithms allocates a number of said slots in said bandwidth allocation table equal to a sum of powers of two, wherein said number of slots is equal to or greater than a size of said bandwidth allocation request.

23. A method for allocating bandwidth in a switch, comprising:
   determining whether a bandwidth allocation request is associated with a delay sensitive connection type;
   selecting, in the event that said bandwidth allocation request is associated with said delay sensitive connection type, at least one of a first set of bandwidth allocation algorithms;
   selecting, in the event that said bandwidth allocation request is not associated with said delay sensitive connection type, at least one of a second set of bandwidth allocation algorithms; and
   wherein said at least one of said first set of bandwidth allocation algorithms reserves a number of a plurality of slots in a bandwidth allocation table equal to a power of two equal to a size of said bandwidth allocation request.

24. The method of claim 23, further comprising a binary tree representation of said slots in said bandwidth allocation table, wherein leaves of said binary tree correspond to individual slots of said bandwidth allocation table.

25. The method of claim 24, wherein said allocation of said number of slots equal to said power of two equal to said size of said bandwidth allocation request includes identifying a branch of said binary tree having a number of leaves corresponding to available slots, said number of leaves equal to said power of two.

* * * * *